Nov. 23, 1965  J. DEAL ETAL  3,218,680
SPONGE RUBBER SEAL STRIPS
Filed Oct. 4, 1963  2 Sheets-Sheet 1
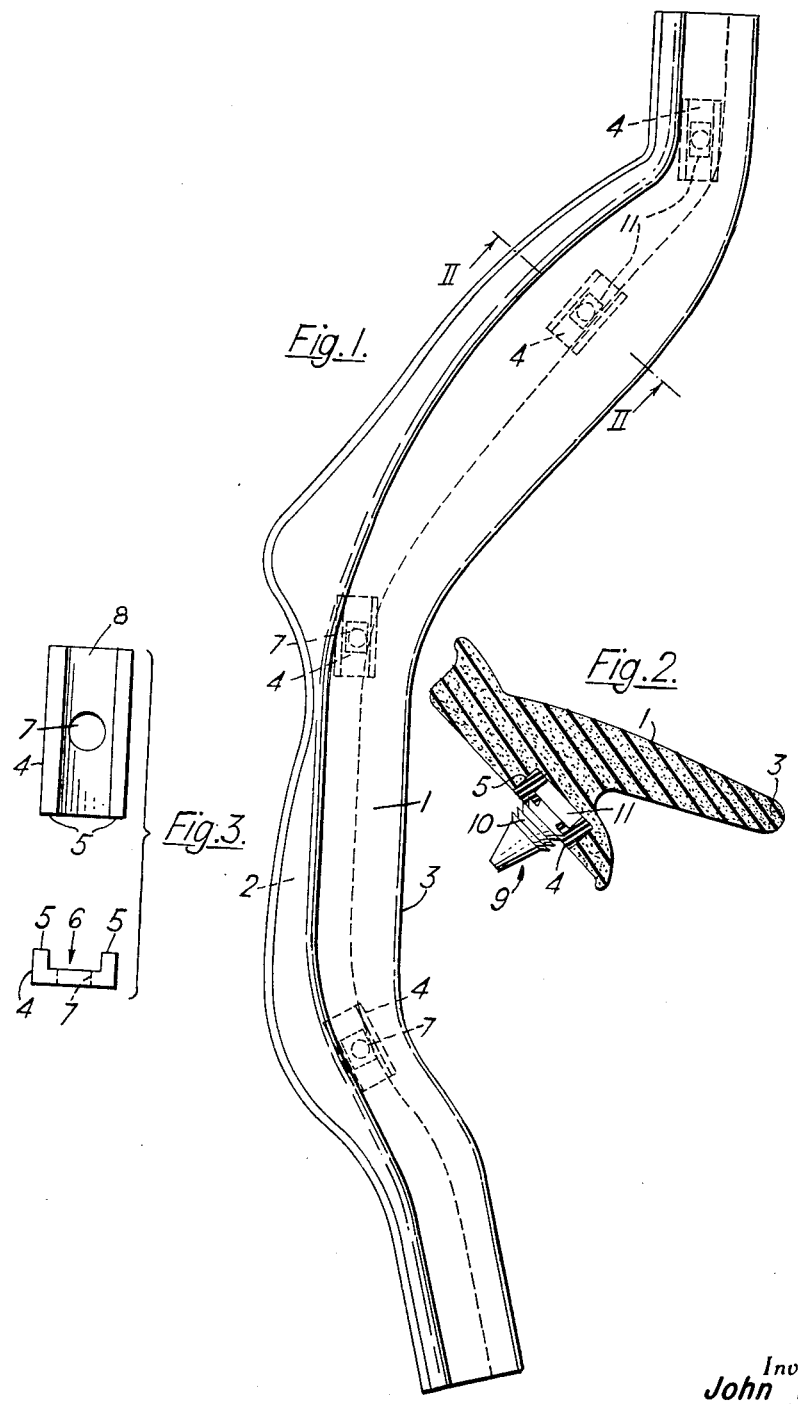
Inventors
John Deal
George Heathcote
BY
Their Attorney

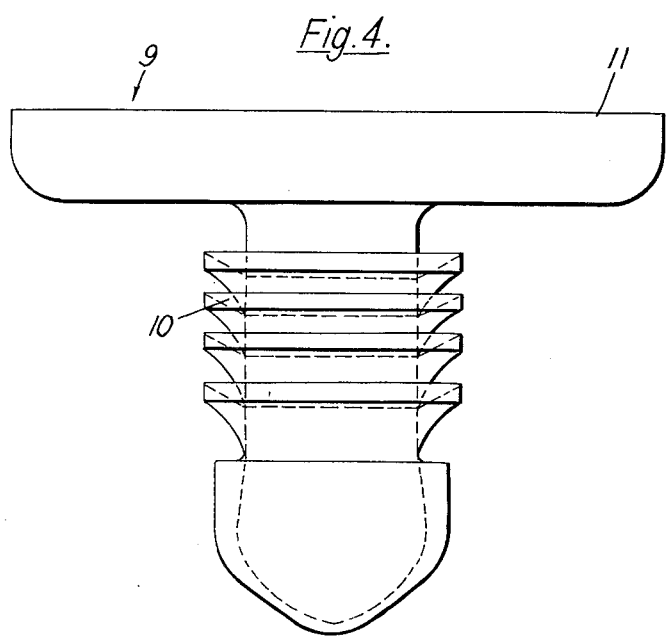

United States Patent Office

3,218,680
Patented Nov. 23, 1965

1

3,218,680
SPONGE RUBBER SEAL STRIPS
John Deal, Luton, Bedfordshire, and George Heathcote, Holland-on-Sea, England; said Deal assignor to General Motors Corporation, Detroit, Mich., a corporation of Delaware, and said Heathcote assignor to H. G. Miles Limited, Dunstable, England, a British company
Filed Oct. 4, 1963, Ser. No. 313,921
Claims priority, application Great Britain, Oct. 13, 1962, 38,845/62
3 Claims. (Cl. 20—69)

This invention relates to sponge rubber seal strips suitable for use in connection with motor vehicles.

According to the invention, a sponge rubber seal strip has embedded in it at intervals pieces of denser rubber through which project the shanks of headed attachment studs the heads of which are accommodated in spaces between the sponge rubber and the denser rubber.

The scope of the invention is defined by the appended claims; how the invention may be performed is particularly described below with reference to the accompanying drawings, in which:

FIGURE 1 is a plan view of a seal strip;
FIGURE 2 is an enlarged section on the line II—II in FIGURE 1, with the addition of an attachment stud;
FIGURE 3 comprises at the top a plan, and at the bottom an end elevation, of a component part of the seal strip shown in FIGURES 1 and 2; and
FIGURE 4 is an enlarged elevation of the attachment stud included in FIGURE 2 taken from a viewpoint displaced by a right angle from that of FIGURE 2.

The example of seal strip shown in FIGURES 1 and 2 comprises a length of sponge rubber 1 having a substantially flat base 2 noted in section in FIGURE 2 for attachment to a surface such as the surround of a motor car door, and a lip 3 which forms the seal element. The cross-sectional shape of the seal strip may vary in dimensions along its length as required; and a length of strip may be straight, or specially moulded to a curved shape, as indicated by FIGURE 1.

Along the flat base 2 there are at intervals pieces 4 of denser rubber embedded in and bonded to the sponge rubber 1, so that the exterior surface of the pieces 4 is flush with the base 2 of the sponge rubber. Each embedded piece 4 is rectangular with its longer dimension longitudinally of the seal strip, and is of the channel shape in transverse section (see FIGURE 3). The channel is on the interior side of the embedded piece 4 so that between the walls 5 of the channel there is a rectangular space 6 between the embedded piece 4 and the sponge rubber 1.

Each embedded piece 4 has a central hole 7 in the web 8 of the channel through which projects the knurled shank 10 of a nylon attachment stud 9 having a head 11 which is accommodated in the space 6, so that the head lies between the embedded piece 4 and the sponge rubber 1. The head 11 of each stud is substantially rectangular in shape (see FIGURE 4) so as to fit the dimensions of the channel between the walls 5. The surface of the motor car door or other structure (not shown) to which the seal strip 1 is to be attached has holes into which the knurled shanks 10 of the studs 9 can be pressed so as to attach the strip firmly.

In the manufacture of the seal strip, the shanks 10 of the nylon studs 9 may be inserted through the holes 7 of the pieces 4 of harder rubber, and these pieces then placed with the proper spacing in a mould in which the sponge rubber portion is moulded, so that during the moulding and vulcanisation process the pieces 4 become embedded in and bonded to the sponge rubber; the strip is thus completed with the studs 9 already fixed in position.

We claim:

1. A spongy rubber sealing strip comprising in combination, a longitudinally extending sealing lip portion and an integrally formed longitudinally extending base portion having a relatively flat face, a plurality of denser rubber inserts embedded in and bonded to said base portion in spaced relation to one another and each having a face substantially coextensive with the face of said base portion, each of said inserts having a grooved surface forming a second face substantially opposed and in parallel relation to the first mentioned face and forming a cavity in cooperation with said base portion, and a headed attachment means associated with each insert, each of said attachment means having an enlarged portion disposed in said cavity and a shank portion extending through said first mentioned face of said insert.

2. The sealing strip claimed in claim 1 wherein each of said inserts is rectangular and of generally channel shaped cross section with the base of said channel forming the first mentioned face whereby said cavity is of rectangular cross section.

3. The sealing strip claimed in claim 2 wherein the enlarged portion of each attachment means is rectangular in shape and is so dimensioned as to be nonrotatable when positioned in said cavity.

References Cited by the Examiner

UNITED STATES PATENTS

| 2,401,202 | 5/1946  | Tinnerman | 151—41.71 X |
| 2,657,438 | 11/1953 | Spraragen | 20—69 |
| 3,110,938 | 11/1963 | Beck et al. | 20—69 |
| 3,139,784 | 7/1964  | Moorman | 20—69 |

FOREIGN PATENTS 673,754    6/1952    Great Britain.

HARRISON R. MOSELEY, *Primary Examiner.*